RADIO FREQUENCY COUPLING TRANSMISSION LINE CIRCUITRY

Filed June 10, 1964 3 Sheets-Sheet 1

INVENTORS
WARREN B. BRUENE
VINCENT R. DeLONG
BY
Moody and Kintzinger
ATTORNEYS

INVENTORS
WARREN B. BRUENE
VINCENT R. DeLONG
BY
Woody and Kintzinger
ATTORNEYS

Aug. 9, 1966 W. B. BRUENE ET AL 3,265,994

RADIO FREQUENCY COUPLING TRANSMISSION LINE CIRCUITRY

Filed June 10, 1964 3 Sheets-Sheet 3

INVENTORS
WARREN B. BRUENE
VINCENT R. DeLONG

BY

Moody and Kintzinger
ATTORNEYS

United States Patent Office 3,265,994
Patented August 9, 1966

3,265,994

RADIO FREQUENCY COUPLING TRANSMISSION LINE CIRCUITRY

Warren B. Bruene, Cedar Rapids, and Vincent R. De Long, Marion, Iowa, assignors to Collins Radio Company, Cedar Rapids, Iowa, a corporation of Iowa Filed June 10, 1964, Ser. No. 373,955
18 Claims. (Cl. 333—17)

Figure 1:
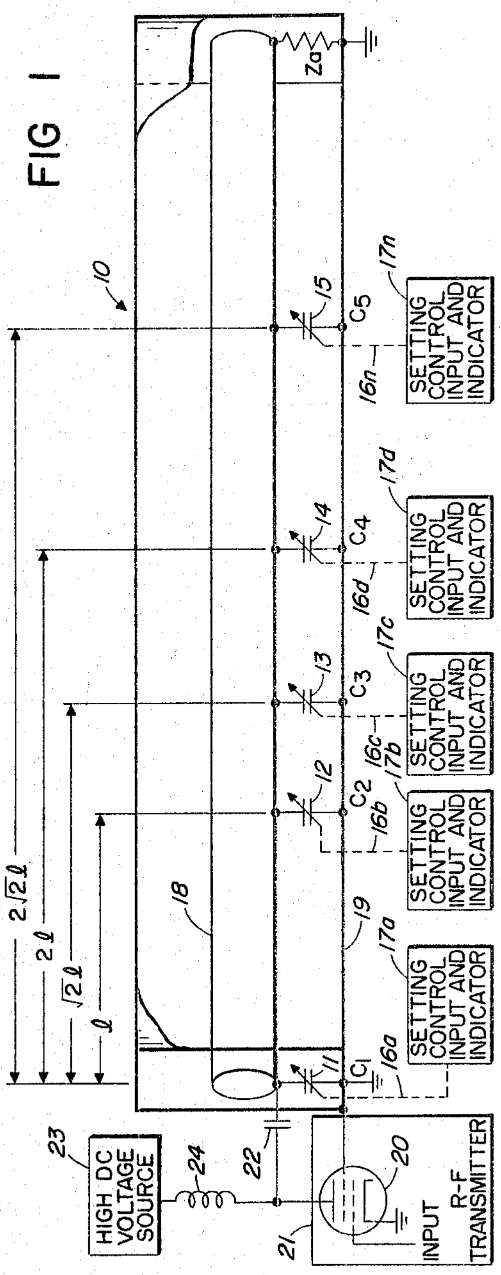

This invention relates in general to RF transmission line coupling networks, for example, between the power amplifier output tubes and an antenna, and in particular to a multi pi-section transmission line with multiple adjustable capacitor controlled RF matching; in another embodiment, also to a three section harmonic filter as part of the RF coupling transmission line; and another embodiment, including the pi-section transmission line network and the harmonic filter, with the last element of the harmonic filter modified to be a tuned balun.

Various RF coupling circuits utilized heretofore have utilized switches, variable inductors, and sliding contacts in coupling network matching to a transmitter power amplifier for efficient transmitted power signal coupling to the output. Such matching is particularly a problem where a wide operating frequency range is desired such as, for example, through the range of approximately from 4 mc. to 26.5 mc. Problems encountered with RF coupling circuitry are further magnified where sufficient attenuation of all harmonics of the fundamental frequency is required to suppress such harmonics, for example, as much as 80 db below the power level of the fundamental frequency wave. Such objectives can be difficult to obtain and the difficulties become magnified with many existing RF coupling systems having higher transmitted power load requirements, in the region of, for example, 250 kw. and even higher. Furthermore, RF signal power losses at such operating loads can be quite significant both cost-wise and in associated problem areas such as may exist, for example, with heat dissipation, signal and voltage isolation. Other problems with such transmission line coupling networks are encountered in feeding D.-C. plate voltage to high RF power output tubes, such as required with some existing circuits. Such problems include impressing the required D.-C. voltage across resonating capacitors, and further, impressing high RF voltage across a plate feed RF choke. Furthermore, some existing transmission line coupling networks present a problem in having high impedance to ground against lightning transients and other D.-C. or A.-C. voltages of a troublesome nature that may from time to time be encountered.

It is, therefore, a principal object of this invention to match high RF power amplifier tubes to a transmission line load with a network not employing switches, variable inductors, or sliding contacts of any kind.

Another object is to provide such a network having a relatively wide operating frequency range such as, for example, 4 mc. to 26.5 mc.

A further object is to provide sufficient attenuation to all harmonics of the fundamental frequency in such a network as to submerge such harmonics at least 80 db below the power level of the fundamental frequency wave.

Still a further object is to provide nearly perfectly balanced output to a balanced transmission line, with a range of impedance matching capability for coupling the transmission line loads with a standing wave ratio of at least 1.5 to 1, and with relatively low losses through the coupling circuitry.

Another object is to provide means for feeding high D.-C. power amplifier plate voltage without impressing D.-C. voltage across resonating capacitors and without having problems of high RF voltage across a plate feed RF choke.

Features of this invention useful in accomplishing the above objects include a multi pi-section transmission line. Multiple adjustable RF matching control capacitors are used, with the first line section capacitor spacing determined by the highest frequencies desired along with the range of frequencies desired, for example, half an octave, by control of the first capacitor as a tuning capacitor and the second capacitor as a loading capacitor. The increased distances from the first capacitor to succeeding capacitors is determined by successive multiples by a factor, such as the square root of two, times the spacing between the first and second capacitors in providing additional frequency adjustable range steps, half octave steps for example, successively through lower and lower frequency range steps with longer and longer resonated lengths. The capacitors in the multiple pi-section transmission line not used as the tuning capacitor or the loading capacitor through any particular frequency range are set to minimum, preferably zero, capacitance. While zero capacitance is not absolutely possible because variable capacitors have some minimum value of capacitance, it is possible, however, in many cases, to provide a small amount of inductance on each side of various capacitors to build out T sections with a characteristic impedance $Z_0$ the same as the transmission line at the respective points.

Some embodiments of the invention include a three section harmonic filter at the output end of a relatively short pi-section transmission line with the two networks complementing each other over the frequency range with their combined harmonic attenuation characteristics. At low frequencies the pi-line network consists of a single resonant section of transmission line. The attenuation of a single section is low but the attenuation of the harmonic filter is at its highest under this condition of operation. At the other end, the high end of the frequency range, where attenuation in the harmonic filter is low, there are several resonant line sections in the pi-line network providing the necessary harmonic attenuation.

Some embodiments also feature a balanced output tuned balun built into the output end of a harmonic filter combined with a pi-line network. The last shorted stub of the harmonic filter is made large enough in cross section that its inner conductor forms the outer conductor of a 150 ohm coax line capable of carrying half of the transmitter power output. A second section of a 150 ohm transmission line duplicating the size of the other 150 ohm coax line is connected to the side of the last shorted stub with only sufficient gap between the facing ends of the two 150 ohm coax lines to prevent voltage breakdown. The length of both of the 150 ohm line sections from the center of the gap between the facing ends to their output ends is substantially identical, and they are connected so the voltages from the respective coax centers, as applied to the opposite coax outer conductors, are of opposite polarity or phase and result in the desired balanced output fed from their output ends to a balanced transmission line feeding an antenna. This converts an input impedance of 75 ohms to the balun, the 75 ohm characteristic impedance of the transmission line, to a 300 ohm balanced output.

Specific embodiments representing what are presently regarded as the best modes of carrying out the invention are illustrated in the accompanying drawings.

Figure 6:
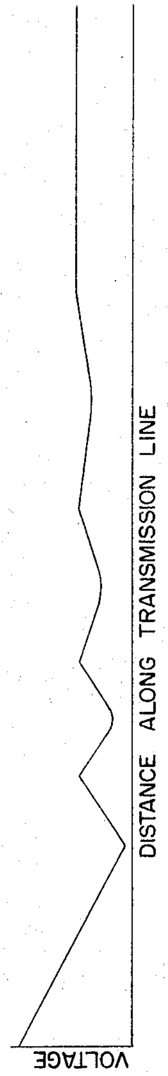
Figure 7:
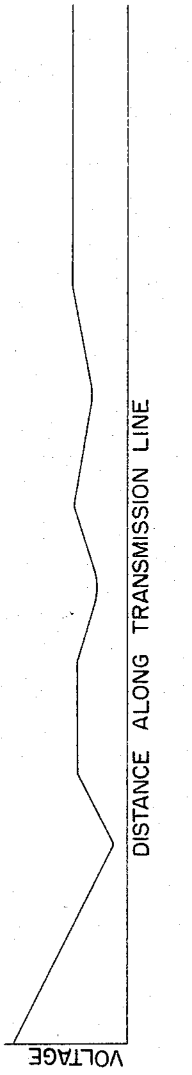
Figure 2:
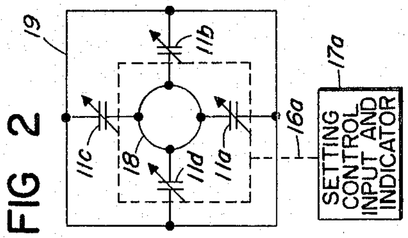
Figure 4:
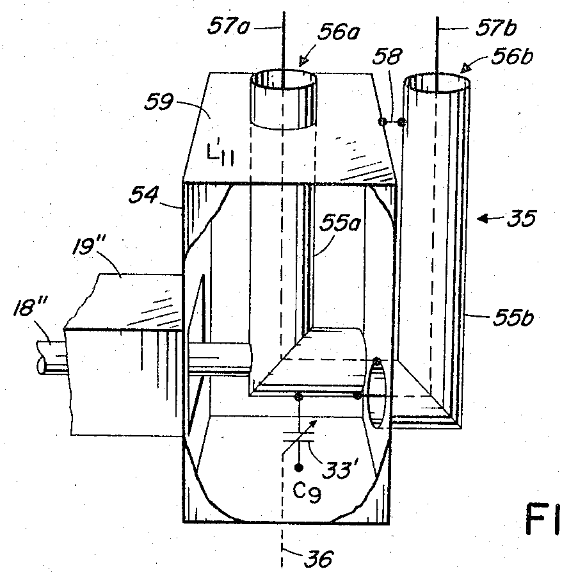
Figure 5A:
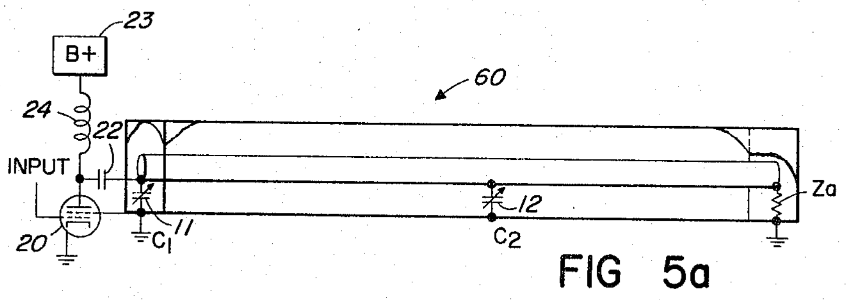
Figure 5B:
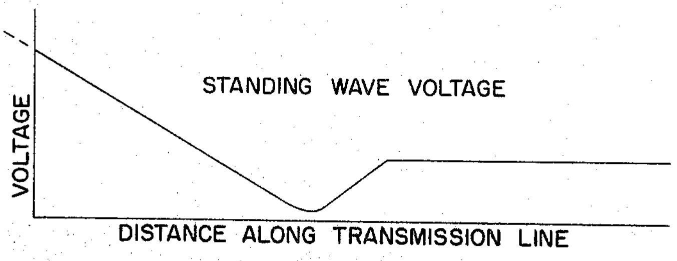
Figure 3:
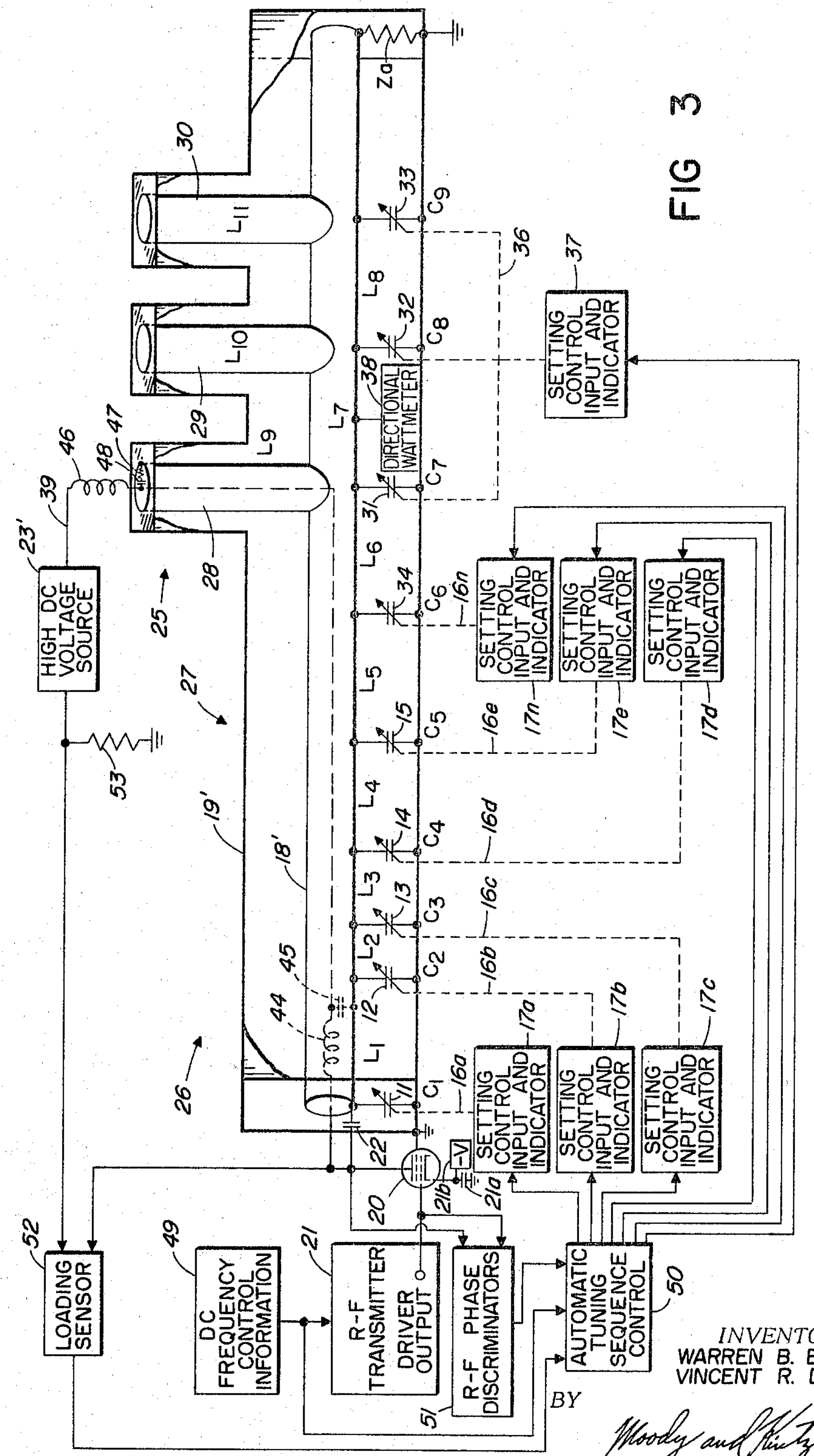

In the drawings:

FIGURE 1 represents schematically a multi pi-section transmission line connected to the RF output of a transmitter power output tube;

FIGURE 2, a schematic cross section of the first capacitor stage of the transmission line showing four variable capacitors in parallel between the inner and outer coaxial line sections of the transmission line;

FIGURE 3, a schematic of the transmission line similar to the transmission line of FIGURE 1, with a three section harmonic filter included at the output end of the multiple pi-section transmission line;

FIGURE 4, a semi-schematic showing of a balun which is substituted for the last section of the harmonic filter at the output end of the transmission line in another embodiment;

FIGURE 5, (*a*) a simplified short section of transmission line schematic, and (*b*) the accompanying standing wave voltage graph;

FIGURE 6, a voltage curve aligned with the capacitor station spacing of FIGURE 1 resulting from resonating the several line sections for greater harmonic attenuation; and FIGURE 7, the same type of voltage curve aligned with the capacitor station spacing of FIGURE 1 with, however, a nonresonant section interposed between resonant sections of the transmission line of FIGURE 1.

Referring to the drawings:

The multiple pi-section transmission line 10 of FIGURE 1 is shown to have multiple capacitor stations $C_1$, $C_2$, $C_3$, $C_4$, and $C_5$ located along the transmission line at discrete predetermined locations. The transmission line 10 pi-section length between capacitor stations is determined by the combination of the highest frequencies desired within the range of frequency adjustment desired within a pi-section, for example, possibly half an octave. The capacitor stations $C_1$ and $C_2$ may be so spaced as to provide a frequency adjustment range of 22 to 26.5 megacycles. Successive capacitor station locations could then be located at increasing distances equivalent to added multiples of the $\sqrt{2}$ times $l$ in determining the distances to successive capacitor stations $C_3$, $C_4$, $C_5$, and additional stations, if desired, from station $C_1$ in providing adjustable frequency range bands by successive steps with each covering approximately half an octave. It should be noted that the input capacitor 11 at capacitor station $C_1$ acts as a tuning capacitor regardless of the length of transmission line from one section to all sections resonated for a desired frequency matching operation. The capacitance at the capacitor station at the end of the length of transmission line resonated whether one pi-section or more, is adjusted as the loading capacitor for the frequency desired within its relative frequency range of adjustment while all other intervening and/or trailing capacitors at the various capacitor stations are adjusted to minimum capacitance.

Referring also to FIGURE 2, similar components in the various embodiments are numbered the same where appropriate as a matter of convenience. The capacitor 11 at capacitor station $C_1$, just as may be the case with the capacitors at the other capacitor stations $C_2$ through $C_5$, capacitors 12 through 15, respectively, or more, may be multiple variable capacitors at each respective capacitor station, such as the four variable capacitors 11*a*, 11*b*, 11*c*, and 11*d*, commonly driven by mechanical drive 16*a* from setting control input and indicator 17*a*. Such setting control input and indicators 17*a* through 17*n* may each be a manually actuated and driven control with a dial indicator giving predetermined capacitor setting indications. Further it should be noted that various setting control input and indicator drives 16*a* through 16*n* may become part of a servo adjusting and programming controlled setting system for such a frequency adjustable transmission line in use. This transmission line, which is particularly useful for high power RF voltages, for example, 250 kw., would have such typical dimensions as, for example, 8 inch diameter tubular center coaxial conductor 18 and a 26 inch square outer coaxial line conductive casing 19.

RF power amplifier tube 20, which may be a single tube or multiple power amplifier tubes in parallel, of an RF transmitter 21 is shown to have a cathode RF by-passed to ground through capacitor 21*a* and connected to minus D.-C. voltage supply 21*b*, and a grounded screen in common with the outer coaxial line conductive casing 19. The plate of the tube is connected for high voltage RF coupled feed through capacitor 22, which may actually be several high power vacuum capacitors in parallel to the tubular center conductor 18 of coaxial transmission line 10. A high D.-C. voltage source 23 feeds plate voltage to the plate of tube 20 through RF choke coil 24. Such a multiple pi-section transmission line 10 design may be designed to cover a frequency range such as 3.95 mc. to 26.5 mc., with 10 capacitor stations. A disadvantage of such a multiple pi- section that coaxial transmission line is that with an unduly large number of capacitor stations, rather uneconomical use is made of large vacuum variable capacitors positioned at the various capacitor stations $C_1$ through $C_5$ on up to, for example, $C_{10}$, since only a relatively small number of them are in use on any given frequency. Furthermore, all ten capacitor stations must have individual setting systems, manual setting or automatic servo drive systems; and particularly, with automatic tuning such multiplicity results in compounded computer programming problems and automatic servo system problems.

In the further embodiment of FIGURE 3, some of the problems existing with the straight multi pi-section transmission line design 10, and with an extended multi pi-section transmission line from the transmission line 10 of FIGURE 1, are overcome through the use of the three section harmonic filter 25 at the output end of the transmission line 26 after pi-line section 27. With operation of this embodiment through the lower frequency ranges of from possibly 3.95 to 7 mc., for example, line sections in the harmonic filter 25 between capacitor stations $C_7$, $C_8$, and $C_9$ are not resonated. Shorted line stubs 28, 29, and 30 are placed across capacitors 31, 32, and 33, respectively, to form in harmonic filter 25 a parallel resonant circuit at each of the three capacitor stations $C_7$, $C_8$, and $C_9$. At harmonic frequencies, the impedance of each stub capacitor location is a low capacitive reactance. This, in conjunction with the line sections connecting stub capacitor stations produces harmonic attenuation in a maner similar to the preceding pi-line transmission line section 27 and the pi-line network embodiment of FIGURE 1. In the embodiment of FIGURE 3, the two networks, the relatively short pi-line section 27, with capacitor stations $C_1$ through $C_6$ and capacitors 11 through 15 and 34, respectively, and the harmonic filter section 25 of transmission line 26 complement each other over the operational frequency range in their harmonic attenuation characteristics. At low frequencies, the pi-line section 27 consists of only a single resonant section of transmission line with harmonic attenuation through such a single resonant section low; however, at these low frequencies the attenuation of the harmonic filter section 25 being at its highest. In the reverse situation at the high end of the frequency range, with attenuation of the harmonic filter section 25 low, there are several resonant sections in the pi-line section 27 to provide the necessary harmonic attenuation.

In the further embodiment of FIGURE 4, a balanced output from a combination pi-section and harmonic filter section transmission line, such as set forth in the embodiment of FIGURE 3, is obtained out of the harmonic filter section by building in a tuned balun section 35 at the output end of the harmonic filter section in place of the last shorted line stub 30 and the output load impedance $Z_a$. In both the FIGURES 3 and 4 embodiments, tubular center coaxial conductors 18' and 18'' of, for example, 8 inch diameter, are contained within the approximately 26 inch square outer coaxial line conductive casings 19' and 19'', respectively. These transmission lines are capable of handling high power RF voltages, for example, 250 kw., with substantial savings in power resulting from considerably reduced tank circuit losses.

Typical transmission line output networks for high frequency transmitters generally have consisted of a pi-section or pi-L section lines with tuning accomplished by the plate capacitor and loading accomplished with the output pi-capacitor or the L section coil. Such networks normally yield about 55 db of harmonic attenuation and have typical efficiencies falling in the approximate range of 80 to 90 percent. Where 80 db spurious rejection is required, such existing networks have required the addition of a 30 db filter at the output of the pi-L transmission line network, with losses in such 30 db filters running as high as 5 percent. At high power levels, not only do these losses become difficult to handle, but the necessary variable inductance coils or switched coils have such high currents that design of contacts to carry the current becomes difficult. To further complicate this situation, coils large enough to handle the required current and voltages pass through spurious resonances, thus resulting in predicted and desired harmonic attenuation not being attained at many operational frequencies. Applicants' new transmission lines, such as set forth in the embodiments of FIGURES 3 and 4, are extremely attractive in overcoming such problems. They not only provide substantial savings in power by reducing tank circuit losses but also give a predictable 80 db of harmonic rejection and require very little maintenance. The resulting tank circuit currents are spread evenly over relatively large surface areas of the coaxial transmission lines rather than being concentrated through coil switching contacts in minimizing tank losses otherwise to be expected with various transmission line coil designs.

Please refer again to the multiple pi-section transmission line embodiments of FIGURE 1. In order that this pi-line section type transmission line be better understood, please refer to the simplified schematic of FIGURE *5a* and to the accompanying standing wave voltage graph of FIGURE *5b*. These show how two capacitors 11 and 12 can resonate a section of the transmission line 60 to match the transmission line load to the correct load impedance $Z_a$ for the amplifier tube 20. With a proper resonated line 60 length choice, the value of input capacitor 11 is adjusted to provide a suitable network input circuit Q in providing the "flywheel" function for maintaining nearly sinusoidal voltage input even though the power amplifier operates in class C mode and conducts current only during approximately one third of each RF cycle. As is well known to the art, this network will behave similarly to a pi-network using an inductor in place of the resonated line section. By simply adjusting capacitors 11 and 12, this network can be designed to operate over an octave of frequency range; however, it is often desirable to limit frequency coverage to half an octave or even less in order to limit circulating current, losses or capacitance range requirements.

Referring again to FIGURE 1, the capacitor stations $C_2$, $C_3$, $C_4$, and $C_5$ are shown to be spaced to distances $l$, $\sqrt{2}l$, $2l$, and $2\sqrt{2}l$, although shorter line lengths and narrower progressive increases in segment lengths may be desirable. However, it should be noted that when line lengths become so short that they approach the diameter of the line, or line cross section dimension, the actual line lengths may become altered from otherwise theoretical parameters in being adapted to desired performance objectives.

More harmonic attenuation can be achieved by resonating additional line section of such a line as is illustrated by the curve of FIGURE 6. It becomes apparent that with bands as wide as $\sqrt{2}$ or one half octave, the third and fourth section of resonant line have a very low SWR (standing wave ratio) and low resonating capacitance. This, along with line wave length increase and approaching one half wave length at the second harmonic, causes poor attenuation at the second harmonic. The shorter line lengths on the order of one eighth or less at fundamental frequency are best and can be best achieved by using narrower band widths such as the $\sqrt[4]{3}$ or 1.315.

This results in a very short second transmission line section with high values of capacitance and circulating current in the second capacitor station, an undesirable situation best avoidable by not resonating the second line section, as indicated by the curve of FIGURE 7. Then, with a substantial amount of capacitance still existing at both ends of the second line section, since it is used to resonate the first and third line sections, the unresonated second section is still effective for harmonic attenuation.

The fact that unused variable capacitors cannot be set to absolute zero capacitance since they have at least some minimum value of capacitance has been noted hereinbefore. However, it is possible in many cases to provide a small amount of inductance on each side of each capacitor to build out T sections with characteristic impedance $Z_o$, the same as the transmission line at the respective points. As the cut-off frequencies of these T sections is well above the highest operating frequency, this technique can be used successfully in effectively avoiding uncompensated shunt capacitance from the unused capacitors. Such inductance can be obtained by using short sections of high impedance $Z_0$ line on each side of each capacitor.

Please refer again to the FIGURE 3 embodiment including a three section harmonic filter 25 following pi-line section 27 at the output end of the transmission line 26. The harmonic filter 25 network can provide good harmonic attenuation for an octave of the frequency range but beyond that the attenuation falls off rapidly since the value of capacitance becomes too small to be effective. There is, however, a way that the useful frequency range can be extended. This may be accomplished by resonating the line sections $L_8$ and input line section $L_6$ in addition to shunt stubs $L_9$, $L_{10}$, and $L_{11}$ of shorted line stubs 28, 29, and 30 respectively. Starting this mode of resonance at approximately 7 mc., for example, brings back more capacitance again and hence more harmonic attenuation in the harmonic filter 25 and thereby permits useful upward extension to higher frequencies of the useful harmonic attenuation range to a total range of approximately two octaves. The line $L_7$ between capacitor stations $C_7$ and $C_8$ is not resonated in order that the capacitance values of the variable capacitors 31, 32, and 33 all remain substantially equal and can be gang driven together through common drive 36 from setting control input and indicator 37. When line section $L_6$ is resonated, variable capacitor 34 at capacitor station $C_6$ is used and adjustably position driven in use through drive **16*n* from setting control input and indicator 17*n***.

A useful characteristic of resonant sections of transmission line is that when a mismatch or SWR is introduced into the load, the SWR of each resonant section is increased by the load SWR. For example, let the SWR in a resonant line section be 10 when tuned for a load of $R_a=Z_o$. If $R_a$ then becomes $Z_a$ which produces a 1.5 SWR in the output transmission line, it will be found that SWR in the resonated line whose SWR was 10 now becomes 10 (1.5) or 15. This means that if capacitors 31, 32, and 33 can be ganged together and set to the position which produces zero SWR across capacitor 34 when $Z_a$ equals the characteristic impedance of the line $Z_o$, the load SWR then appears across capacitor 34. On the lowest frequency band from 3.95 to 5 mc., the pi-section capacitors 11 and 34 may be adjusted to match the load impedance appearing at capacitor 34 to the desired tube load resistance such as 400 ohms. On this band, capacitor 11 is tuned to resonate the network to provide a resistive load to the tube 20. Capacitor 34 is adjusted to produce the desired value tube load resistance. It has been found practical to just preposition all capacitors except the input pi-section when the antenna load impedance does not exceed 1.5 to 1 SWR. On the highest frequency band, capacitor 11 is the tuning and capacitor 12 is the loading capacitor. Tuning the network thus is very simple. All capacitors are set to predetermined values for a zero SWR load impedance. The transmitter is then turned on and capacitor 11 and the other pi-section capacitor used for loading are adjusted for resonance and correct loading just as would a simple pi-network. When the load SWR is high, it is possible to use the pi-section, including variable capacitor 15, section length $L_4$, and section length $L_6$ as a matching section also. This has the advantage of avoiding voltage and current increases between capacitor 11 and capacitor 34 due to the SWR of the load impedance.

An analysis of a line section resonated by capacitors will show that the equivalent shunt input resistance to the resonated line is determined only by the line $Z_0$, the load impedance and the output capacitor. In other words, it can be set to the desired value, which usually is $R=Z_0$, by simply adjusting the output capacitor. The value of equivalent shunt resistance can be determined by measuring the voltage across the input. If the power is known, the value of R can be established by solving $$R=\frac{e^2}{p}$$

Power output can be measured with a directional wattmeter 38, as shown connected between center coaxial conductor 18' and outer coaxial line casing 19' in FIGURE 3, in the transmission line to the load or an antenna. It can also be closely estimated by measuring power input to the power amplifier tube and applying an estimated efficiency factor such as 75%.

Another means of establishing the correct voltage is to compare it to the voltage across a known resistive load. This can be the tube load resistance. For example, an automatically tuned transmitter may tune up on low power and the pi-section would be automatically adjusted to produce a 400 ohm tube load. If a value of 75 ohms is desired across capacitor 15, the voltage across capacitor 15 should be $$E_{c1}\sqrt{\frac{75}{400}}\text{volts}$$

In an automatically tuned transmitter, samples of voltages across capacitor 11 and capacitor 15 can be rectified and used to operate a servo for setting capacitor 34 to the correct value in an additional control system not detailed. With such control, capacitor 15 must then be adjusted to present the desired equivalent shunt resistance across the capacitor preceding it, an adjustment which may be accomplished in the same manner. This preceding capacitor, capacitor 14, for example, need not be readjusted if it were previously correctly set for the case of a zero SWR load impedance.

The high D.-C. plate voltage in the embodiments of FIGURES 3 and 4 is supplied from high D.-C. voltage source 23' on a heavy solid conductive line 39 through the center of the tubular center coaxial conductor of shorted line stub 28 and on longitudinally through the center of the tubular center coaxial conductor 18' from the shorted line stub 28 to capacitor station $C_1$ and on to its connection with the terminal of the plate of tube 20. The only RF voltage that needs to be removed from this high voltage feed is the relatively small RF voltage developed across the plate blocking capacitor 22. Thus, the RF choke coil 44 can be of low inductance so chosen as to have all series self resonances well above the highest frequency operating range. RF by-pass capacitor 45 is provided to give a low reactance across the end of the 150 ohm coaxial plate feed line. At the D.-C. input end of line 39, the power supply 23' is isolated from RF by an RF choke coil 46. A resistor 47 of 150 ohms, for example, along with its associated series connected D.-C. blocking capacitor 48 terminates the 150 ohm plate feed line 39, for which the value of resistor 47 was chosen to match the $Z_0$ of line 18', to prevent standing waves on it. These components, the RF choke coil 46, resistor 47, and capacitor 48 may be located inside the line at the shorted end of shorted line stub 28. The presence of undesired standing waves could be excited with a very small amount of energy on an unloaded line to such an extent as to present voltage breakdown problems, readily prevented by the 150 ohm load.

The directional wattmeter 38 is advantageously located in line section $L_7$ connected between center coaxial conductor 18' and outer coaxial line casing 19' in the embodiments of FIGURES 3 and 4 since this particular section in the mode of operation is not resonated on any frequency band throughout the operational range of frequencies. The wattmeter 38 can be used to measure SWR from the output 300 ohm transmission line, assuming capacitor 33 at capacitor station $C_9$ is set to the correct value. The reflected power output of the directional wattmeter 38 coupler can be used to indicate excessive SWR on the load transmission line and turn the transmitter off, if desired, via conventional circuitry, not detailed. Furthermore, it would still operate substantially the same even if the capacitor 31 at capacitor station $C_7$ were badly mistuned.

Referring again particularly to the embodiment of FIGURE 3, an automatic servo and programming control system is indicated for providing suitable input signals and servo setting control signals to the setting control input indicators 17*a* through 17*n* and 37. This is in addition to the manual setting capabilities provided with each of these control units, which actually could be utilized without the additional servo control system. An operator at control console 49 may selectively control the frequency setting of the transmitter and the transmission line tank circuits by desired frequency setting of the D.-C. frequency control information console. This provides crystal frequency controlling input information to RF transmitter driver 21 and also the same D.-C. voltage input information to automatic tuning sequence control program and servo signal control 50. This control 50, including a predetermined programming system, also receives a D.-C. input developed in RF phase discriminators section 51 by the RF phase relationship between the RF voltage of the plate and the RF voltage at the grid of tube 20. Another input to tuning sequence control program and servo signal control 50 is provided from loading sensor 52 which develops its D.-C. output signal from a sample of the D.-C. plate current of tube 20, and also from a rectified sample of plate RF voltage out of power amplifier tube 20. The D.-C. plate current of tube 20 is developed across a high current low resistive value resistor 53 connected between ground and high D.-C. plate voltage source 23'. The servo system may be arranged to respond to tuning information from a coarse positioning bridge (digital to analog converter) and fine tuning discriminators. By way of reiteration, upon command from the control console 49 the automatic frequency and control circuits take control of the amplifier and step the transmitter through a complete tuning cycle by D.-C. control information directing the RF amplifier in tuning to a new frequency. The tank circuits of the RF amplifiers are adjusted to approximate coarse tuning position. After coarse positioning of tank circuits associated with the transmission line 26 as initiated by the console frequency information, each tank circuit is selected for servo positioning in resonating action as determined by frequencies selected using reference information supplied by the phase discriminator 51 and also information fed back through the loading sensor 52. When all voltages, currents, and power are in proper order, the control circuits notify the console (detail not shown) that the tank tuning cycle has been completed, in the tuning process requiring at most approximately 20 seconds.

Please refer again to the embodiment of FIGURE 4 which differs from the embodiment of FIGURE 3 primarily in replacing the last shorted line stub 30 of the FIGURE 3 embodiment with tuned balun section 35. This tuned balun section 35 converts an unbalanced condition toward the output end of the transmission line 26 of FIGURE 3, as modified in the embodiment of FIGURE 4, through the tuned balun section 35 to a balanced output. A portion of this tuned balun still acts as a shorted shunt stub $L'_{11}$, however, in enlarged form from the shunt $L_{11}$ of the FIGURE 3 embodiment. This last shorted stub $L'_{11}$ of the FIGURE 4 embodiment is made with its outer coaxial line conductive casing 54 enough larger in cross section than coaxial line casing 19″ and the stub $L_{11}$ in the FIGURE 3 embodiment, to permit an enlargement of the inner conductor **55*a* sufficient to form the outer conductor of a 150 ohm coax line 56*a***.

This coax line **56*a* has a heavy center coaxial conductor 57*a* in a coaxial line properly designed to carry half the transmitter power output. In a working embodiment of a 250 kw. transmitter, the 150 ohm coaxial line is 8 inches in diameter. Further, a second section of 150 ohm coax transmission line 56*b*, of substantially the same size as coax line 56*a*, having a coaxial outer conductor 55*b* and inner coax conductive line 57*b*, is mounted to the exterior and connected to the side of shorted stub $L'_{11}$. This coax line 56*b* is mounted in a specific carefully determined relationship to the coax line section 56*a* to form the balanced output tuned balun 35. The inner tubular coax 18″ of the transmission line 26 of this emmodiment is directly connected to the base of conductor 55*a* of coax line 56*a*. The gap between the facing ends of coaxial lines 56*a* and 56*b* is normally at a spacing only a little more than enough to prevent voltage breakdown in order to keep the leads across this gap short. These leads across the gaps are the continuations of the inner coax conductive lines 57*a* and 57*b* to connection with the outer coaxial casings 55*b* and 55*a*, respectively, at the facing ends of the coax lines 56*a* and 56*b*. It is important that the length from the respective facing ends to the upper output ends of the coax line sections 56*a* and 56*b* be substantially identical. It should be further noted that substantially identical coax section 56*a* and 56*b* line lengths are so interconnected as to form the balanced output balun 35. That is accomplished with the horizontal length of coax line section 56*a* being of sufficiently greater length than the horizontally extended portion of line section 56*b* to compensate the greater vertical dimension of the coax section 56*b* than the vertical dimension of coax line section 56*a***. These are constructed in this manner to provide the desired interconnection at their facing ends and also provide properly spaced balun output connection terminating electrically balanced output connection ends in the same horizontal plane at the upper output end of the balun.

It should be noted that coaxial line section **56*b* of balun 35 is fastened by conductive means 58 adjacent its upper end to the shorting end 59 of shorted stub $L'_{11}$. With the balun connections shown, the voltages from center to outer conductors of the balun coaxial sections 56*a* and 56*b* are of opposite polarity or phase resulting in the desired balanced output at the upper ends of the coaxial sections 56*a* and 56*b*. Characteristic impedance of the transmission line at the input of the balun and shorted stub $L'_{11}$ is 150/2 or 75 ohms. The variable capacitor 33′, which is driven by the control drive 36 from a setting control input and indicator 37 as shown in the FIGURE 3 embodiment, tunes out the inductive reactance, shunting the 75 ohm characteristic impedance at the input of the balun, of shorted line stub $L'_{11}$. When capacitor 33′ tunes the shorted stub $L'_{11}$, any SWR on the 300 ohm balun 35** output load will also appear at the balun input fed by line section $L_8$.

Capacitor values and capacitor station spacings used in a working embodiment of the transmission line section for a 250 kw. transmitter, referring to FIGURES 3 and 4, and as related particularly to the embodiment of FIGURE 4, including the balanced output balun 35 at the output end of the transmission line, are as follows:

| Capacitor Station | Number of Variable Capacitors | Maximum Value Each Capacitor |
|---|---|---|
| $C_1$ | 2 | 800 picofarads. |
| $C_2$ | 4 | 650 picofarads. |
| $C_3$ | 3 | 650 picofarads. |
| $C_4$ | 3 | 1,200 picofarads. |
| $C_5$ | 3 | 1,600 picofarads. |
| $C_6$ | 4 | 1,600 picofarads. |
| $C_7$ | 2 | 1,600 picofarads. |
| $C_8$ | 2 | 1,600 picofarads. |
| $C_9$ | 2 | 1,600 picofarads. |

| Pi-Line Section | Between Capacitor Stations | Length |
|---|---|---|
| $L_1$ | $C_1$–$C_2$ | 25 inches. |
| $L_2$ | $C_2$–$C_3$ | 24 inches. |
| $L_3$ | $C_3$–$C_4$ | 24 inches. |
| $L_4$ | $C_4$–$C_5$ | 36 inches. |
| $L_5$ | $C_5$–$C_6$ | 83.7 inches. |
| $L_6$ | $C_6$–$C_7$ | 132 inches. |
| $L_7$ | $C_7$–$C_8$ | 120 inches. |
| $L_8$ | $C_8$–$C_9$ | 132 inches. |

The pi-line network of the FIGURE 4 embodiment (FIGURE 3 with the balun of FIGURE 4) is basically a length of 75 ohm coaxial transmission line with vacuum variable capacitors located at calculated positions. These positions were determined as optimum locations for the vacuum capacitor groups (i.e., capacitor stations), for harmonic rejection through the eighth harmonic, and for loads around a 2 to 1 VSWR. The 3.95 to 26.5 mc. frequency range is covered in five bands, with the first five line sections and capacitor group stations $C_1$, and one of $C_2$ through $C_6$ accomplishing the phasing and loading functions, respectively, and with the unused capacitors on a particular band being set at minimum capacitance.

The resonated sections of transmission line are analogous to inductors in a pi-network. The SWR on the line is roughly analogous to circuit Q and further with losses very low because the circulating tank currents are spread evenly over the large surfaces of the coaxial transmission line. For a more thorough understanding of operation of an existing pi-line network in a 250 kw. high frequency transmitter, consider operation in the 3.95 to 6 mc. range with the pi-line capacitors adjusted for low band operation. For such low band operation the capacitors at capacitor stations $C_2$, $C_3$, $C_4$, and $C_5$ are set to minimum capacitance while the capacitors at stations $C_1$ and $C_6$ are the active elements adjustably used for phasing and loading, with the tuning system adjusting only the capacitor stations $C_1$ and $C_6$. Capacitor station $C_1$ resonates the output circuit and capacitor station $C_6$ is adjusted for proper transmitter loading as in any common pi-network circuit. Harmonic filter capacitor stations $C_7$, $C_8$, and $C_9$ are simultaneously set for resonating the respective harmonic filter shorted stubs $L_9$, $L_{10}$, and $L'_{11}$ to provide the desired harmonic rejection. The setting of these harmonic filter section capacitors is controlled by circuitry from frequency information and normally, without manual adjustment, are not subject to being mistuned by the operator. Shorted stubs $L_9$, $L_{10}$, and $L_{11}$ are always resonated by the respective capacitors of the respective capacitor stations $C_7$, $C_8$, and $C_9$, and further, above approximately the first octave of frequency adjustment transmission line sections $L_6$ and $L_8$ are also resonated.

By way of further illustration, when operation in the highest frequency band, in the 22 to 26.5 mc. range is desired, the capacitor values are changed for resonance of the shortest resonating section length of the pi-line network. In this mode of operation, the tuning system adjusts capacitor stations $C_1$ again and also capacitor station $C_2$, only, with the capacitor station $C_2$ now assuming the role of loading capacitor, and with the other capacitor stations $C_3$ through $C_6$ being set to minimum capacitance. In this extremity high frequency range of operation, where the harmonic filter 25 rejection is lowest, the line sections $L_2$, $L_3$, $L_4$, $L_5$, and $L_6$ advantageously act as a low pass harmonic filter. Obviously, intervening frequency adjusted bands all employ the adjustment of the capacitor station $C_1$ as an active element and one of the capacitor stations $C_3$, $C_4$, and $C_5$ as an active element for loading, with the particular capacitor station loading element being used consistent with the desired frequency band of operation.

Lengths in the actual physical embodiment are modified to some extent, in departing from strictly geometric successive multiples of the first transmission line pi-section length and the initial pi-line section lengths, to successive capacitor stations, as indicated in the embodiment of FIGURE 1, to meet desired operational parameters, particularly for the extreme low and extreme high frequency bands. Various reasons for this include facts such as, that the capacitor stations employ rather large capacitors and are therefore not finite points but instead operational areas. Furthermore, the actual working embodiment, rather than being laid out in a straight linear line, is turned and angled in an operational configuration to meet reasonable spacing and operational requirements.

Again it might be noted that there is a particular bonus value in the extremely low loss of the configuration utilizing a coax having approximately a 24–26 inch square outside shell with an approximately 8 inch diameter inner conductor. Whereas conventional networks designed to provide the required 80 db spurious rejection often have losses as high as 20 percent, the pi-line network has typically a 3 to 5 percent loss. At the 250 kw. power level, the savings in primarily power alone is justification for the pi-line type output network.

In referring again to the high voltage feed to the plate of power amplifier tube 20, it should be particularly noted that this high voltage feed is accomplished without the necessity for the usual plate choke by bringing the high voltage lead through the inside of the pi-line center conductor 18' as shown in FIGURE 3. Furthermore, the high voltage feed emerges from the harmonic filter portion of the transmission line 26 at a point which is at substantially RF ground potential, a fact that thereby minimizes the conducted RF on the high voltage feed line and would permit reasonable operation of such a transmitter even without RF choke coil 46. The inherently lower RF voltages further reduce the requirement for large amounts of decoupling capacitance and thereby ease the high frequency loading on the transmitter modulator. Even further, the choke at the input of the transmission line 26 connected to the plate of tube 20 must withstand only the RF developed across the blocking capacitor 22 (blocking capacitor 22 in the working 250 kw. transmitter is actually two vacuum capacitors in parallel).

Whereas this invention is here illustrated and described with respect to several embodiments thereof, it should be realized that various changes may be made without departing from the essential contributions to the art made by the teachings hereof.

We claim:

1. In a radio frequency transmission line coupling network, a multi pi-section transmission line having a center coaxial line conductor and an outer coaxial line conductive casing; multiple adjustable capacitors connected between the center coaxial conductor and the outer coaxial conductive casing at longitudinally spaced capacitor station locations along the transmission line; means for adjustably setting the capacitive value of capacitors located at the capacitor stations; a capacitor station located at the input end of the transmission line adjustable as a tuning capacitor regardless of the length of transmission line resonated for a desired frequency matching operation, with the capacitance of the capacitor station at the end of the length of transmission line resonated being adjusted as the loading capacitor for the frequency desired within the relative frequency range of adjustment of the increased transmission line length from the previous capacitor station, and with all other capacitor stations being adjusted to minimum capacity.

2. The RF transmisison line coupling network of claim 1 wherein, the capacitor station at the input end of the transmission line and the first capacitor station located longitudinally down the transmission line are located at a longitudinal spacing approximating a predetermined distance $l$ and with succeeding capacitor stations spacing in increasing distances from the input end capacitor station as determined by successive multiples by a predetermined factor times the predetermined distance $l$ providing additional frequency adjustable range steps, respectively, successively through lower and lower frequency range steps with longer and longer resonated lengths.

3. The RF transmission line coupling network of claim 2 wherein, distance $l$ spacing between the first and second capacitor stations is chosen to provide a frequency adjustment range of from approximately 26.5 megacycles down to approximately 22 megacycles; and with the successive capacitor station locations thereafter being located at increasing distances substantially equivalent to added multiples of the square root of two times $l$.

4. The RF transmission line coupling network of claim 1 wherein, the means for adjustably setting the capacitance of the capacitor stations includes manually actuated and set control means; and including indicators giving predetermined capacitor setting indications for each capacitor station.

5. The RF transmission line coupling network of claim 1 wherein, a transmitter power amplifier output tube is connected for feeding the RF signal output as an input to said multi pi-section transmission line through an RF coupling capacitor connected between the plate of the RF power amplifier tube and said center coaxial line conductor; and a high D.C. plate voltage source connected through an RF choke coil to the output plate of said RF power amplifier tube.

6. The RF transmission line coupling network of claim 1 wherein, a shorted line stub section is included after the multi pi-section transmission line having at least one shorted line stub, said center coaxial line conductor being a tubular center coaxial line conductor extended through said shorted line stub section; a variable capacitance capacitor station longitudinally located along the transmission line coupling network at each shorted line stub; means for adjustably setting the capacitive value of capacitors located at such shorted line stub capacitor stations; and with said shorted line stub including a tubular branch extension of said tubular center coaxial line conductor terminated at the shorting face end of a cooperating coaxial shorted line stub branch of the outer coaxial line conductive casing.

7. The RF transmission line coupling network of claim 6 wherein, transmitter power amplifier output tube means is plate output connected through an RF coupling capacitor to said tubular center coaxial line conductor; and a high D.-C. plate voltage source is connected through an RF choke coil to the output plate of said RF power amplifier tube means.

8. The RF transmission line coupling network of claim 7 wherein, connective line means extends from said high D.-C. plate voltage source coaxially through said shorted line stub tubular branch extension, and forwardly from said shorted line stub coaxially through said tubular center coaxial line conductor to and out of the input end of said multi pi-section transmission line to the plate of said tube.

9. The RF transmission line coupling network of claim 8 wherein, said RF choke coil is of relatively low inductance so chosen as to have all series self resonances well above the highest frequency operating range of the RF transmission line; and RF by-pass capacitor connected between high D.-C. plate voltage connective line means and the tubular center coaxial line conductor; and a relatively low value resistor connected in series with a D.-C. blocking capacitor between said high D.-C. plate voltage connective line means and the tubular branch extension of said tubular center coaxial line conductor adjacent the shorting face end of the respective cooperating coaxial shorted line stub.

10. The RF transmission line coupling network of claim 9 wherein, said RF choke coil and said RF by-pass capacitor are located inside said tubular center coaxial line conductor adjacent the input end of said multi pi-section transmission line; and with said low value resistor along with its series connected D.-C. blocking capacitor being located inside said tubular branch extension of said tubular center coaxial line conductor adjacent the shorting face end of a shorted line stub.

11. The RF transmission line coupling network of claim 9 wherein, automatic servo and programming control system means is provided for servo positioning and adjusting the capacitor stations of said RF transmission line coupling network in response to a desired frequency control setting input; said servo system being connected to be partially responsive to a sample of plate RF output signal from said RF power amplifier output tube means, and a D.-C. plate current sample of said power amplifier output tube means developed across a high current low resistive value resistor connected between a voltage potential reference and said high D.-C. plate voltage source.

12. The RF transmission line coupling network of claim 11 wherein, manual adjustment means is included in addition to and with said automatic servo and programming control system; and with additional signal RF phase discriminators providing a control input to an automatic tuning sequence control developing individual outputs to respective setting control input and indicators of the separate capacitor stations of the multi pi-section transmission line; and with multiple shorted line stubs through a shorted line stub section, capacitor stations of respective shorted stub having a common drive from a setting control input and indicator servo controlled by an output of the servo system automatic tuning sequence control.

13. The RF transmission line coupling network of claim 6 wherein, said shorted line stub section includes multiple shorted line stubs successively spaced down the transmission line and forming a tuneable harmonic filtér with the capacitor stations at each shorted line stub commonly gang driven to the desired common setting by setting control input and indicator means; and with a transmission line length between two adjacent shorted stubs nonresonated throughout the operational frequency ranges of the transmission line.

14. The RF transmission line coupling network of claim 13 wherein, a directional wattmeter is connected between said tubular center coaxial line conductor and said outer coaxial line conductor, and longitudinally located at the nonresonated line section of the shorted line stub section of the transmission line.

15. The RF transmission line coupling network of claim 13 wherein, said shorted line stub section is a three shorted line stub section harmonic filter longitudinaly located after said multiple pi-line section transmission line.

16. The RF transmission line coupling network of claim 13 wherein, the last of said multiple shorted line stubs of said shorted line stub section forming a harmonic filter is provided with an unbalanced input to balanced output balun.

17. The RF transmission line coupling network of claim 6 wherein, the last shorted line stub is combined with an unbalanced input to balanced ouput tuned balun with the tubular center coaxial line conductor of the transmission line terminating in a first L shaped tubular coaxial portion of the balun; with a section of the first L shaped tubular coaxial portion of the balun forming the tubular branch extension of the last said shorted line stub extending from said tubular center coaxial line conductor to the shorting face end of the cooperating coaxial shorted line stub branch of the outer coaxial conductive line casing; with the base of the first L shaped tubular coaxial portion of the balun terminating in a face relatively closely spaced from the adjacent face of a similar second L shaped tubular coaxial portion of the balun with the face thereof mounted on a side of and open to the inside of said shorted line stub branch of the outer coaxial line conductive casing; each of said balun first and second L shaped portions being provided with heavy inner coaxial conductive lines coextensive with the lengths thereof and extending from said adjacent facing ends to respective connections with the opposite outer coaxial casing of the respective opposite balun L shaped portion; outer terminating ends of said balun first and second coaxial L shaped portions being substantially common to a plane adjacent the shorting face of said last shorted line stub; conductive means between the shorting end of said shorted line stub and said second L shaped tubular coaxial portion adjacent the terminated end thereof; said first and second balun L shaped tubular coaxial portions being of substantially the same overall length from their adjacent facing ends to their respective output terminated ends; and an adjustable capacitor station connected between said outer coaxial line conductive casing and said balun first L shaped tubular coaxial portion within said shorted line stub.

18. In an RF transmission line coupling network a shorted line stub combined with an unbalanced input to balanced output tuned balun at the unbalanced output end of a transmission line having a logitudinally extended hollow inner coaxial conductor and an outer coaxial conductive casing; the transmission line longitudinally extended hollow inner coaxial conductor being terminated at the output end in a first L shaped hollow coaxial portion of the balun; with a section of the first L shaped hollow coaxial portion of the balun forming the hollow branch extension of said shorted line stub extending from said hollow center coaxial line conductor to the shorting face end of the cooperating coaxial shorted line stub branch of the outer coaxial conductive line casing; with the base of the first L shaped hollow coaxial portion of the balun terminating in a face relatively closely spaced from the adjacent face of a similar second L shaped hollow coaxial portion of the balun with the face thereof mounted on a side of and open to the inside of the shorted line stub branch of the outer coaxial line conructive casing; each of said balun first and second L shaped portions being provided with heavy inner coaxial solid conductive lines coextensive with the lengths thereof and extending from said adjacent facing ends to respective connections with the opposite outer coaxial casing of the respective opposite balun L shaped portion; outer terminating ends of said balun first and second coaxial L shaped portions being substantially common to a plane adjacent the shorting face of said shorted line stub; conductive means between the shorting end of said shorted line stub and said second L shaped hollow coaxial portion adjacent the terminated end thereof; said first and second balun L shaped hollow coaxial portion being of substantially the same overall length from their adjacent facing ends to their respective output terminated ends; and an adjustable capacitor station connected between said outer coaxial line conductive casing and said balun first L shaped hollow coaxial portion within said shorted line stub.

No references cited.

HERMAN KARL SAALBACH, *Primary Examiner.*

M. NUSSBAUM, *Assistant Examiner.*